Nov. 9, 1965 A. JANSONS 3,217,185
RING COUNTER STABILIZING CIRCUITRY FOR CONDITIONS
OF NON-CONDUCTION OF ALL STAGES OR
CONDUCTION OF MORE THAN ONE
Filed July 5, 1963
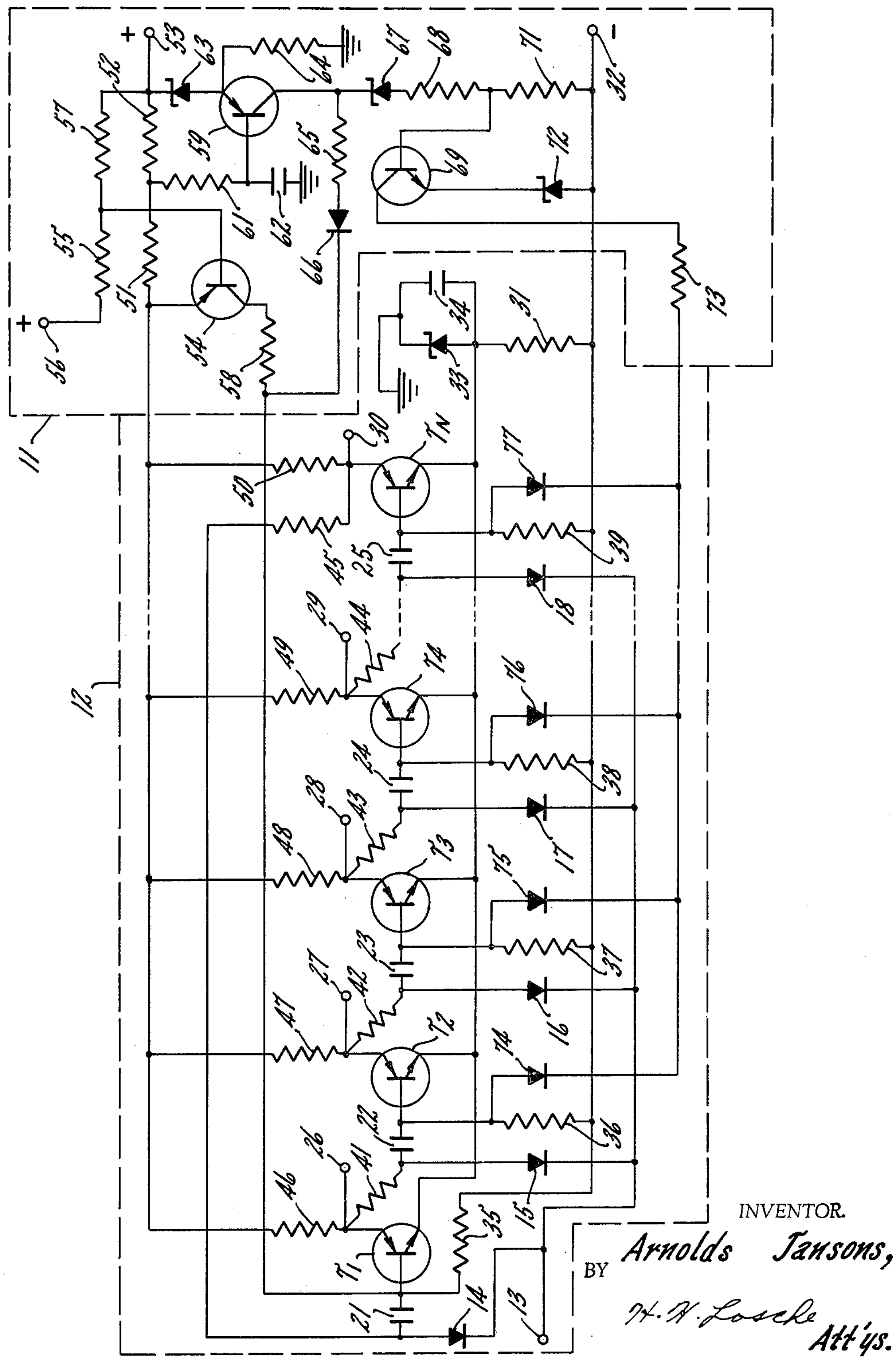
INVENTOR.
Arnolds Jansons,
BY H. H. Losche
Att'ys.

3,217,185

RING COUNTER STABILIZING CIRCUITRY FOR CONDITIONS OF NON-CONDUCTION OF ALL STAGES OR CONDUCTION OF MORE THAN ONE

Arnolds Jansons, Indianapolis, Ind., assignor to the United States of America as represented by the Secretary of the Navy Filed July 5, 1963, Ser. No. 293,213
5 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention is generally related to electronic computing circuitry and more particularly to stabilization circuitry for ring counters utilizing four-layer, three-terminal, bistable semiconductor devices as the switching elements therein.

Those engaged in the design and development of modern electronic computing, counting, and time generating circuitry, both commercial and military, are well aware of the utility and necessity of ring counting circuitry, and the need for reliable operation thereof throughout relatively broad ambient temperature ranges. The use of ring counters in airborne radar fire control systems and missile control circuitry, which are examples of military applications, necessitate extreme reliability under most adverse ambient conditions. It has been found that semiconductor ring counters of the prior art having more than four or five stages may become unreliable under various ambient conditions. Investigation of these circuits under adverse conditions has disclosed malfunctioning in two common forms. First, all stages have been found to be in an "OFF" condition at the same time and second, more than one stage has been found to be in an "ON" condition at one time. Either of these malfunctions destroys the effectiveness of such ring counting circuitry and prevents its use in critical commercial or military applications.

The present invention was conceived to overcome these disadvantages of prior art ring counters and to provide them with the stability necessary to permit their safe use where desired in critical applications with assured reliability. The invention utilizes three transistors and associated component circuitry in a novel arrangement to assure that one and only one stage of the associated ring counter is in an "ON" state at all times. The invention senses the condition when all stages are "OFF" and immediately places the first stage in an "ON" condition, and further, senses the condition of simultaneous operation of more than one stage and immediately stops conduction in all stages except the first which is pulsed to make certain that it is placed in an "ON" state.

An object of the present invention is to provide a reliable solid state ring counter circuit.

Another object is to provide reliability for a solid state ring counter having many stages over wide ranges of ambient temperature and other environmental extremes.

A further object of the invention is the provision of a reliability circuit for use in conjunction with a solid state ring counter circuit to insure that one and only one stage of the ring counter is at all times in an "ON" state.

Other objects, advantages and novel features of the invention will become apparent from the following detailed description of the invention when considered in conjunction with the accompanying figure of drawing which illustrates one suitable embodiment of the present invention in schematic form.

Referring now to the figure of drawing there is shown a specific embodiment of the invention in block 11 coupled to a solid state ring counter circuit of a suitable type in block 12, many of which are well known in the art. The ring counter of block 12 has an input terminal 13 for receiving input trigger pulses which are then conveyed via diodes 14–18 and capacitances 21–25 to the gate electrodes of three-terminal PNPN silicon devices $T_1$–$T_n$, which are bistable elements commonly known as "trigistors" or "transwitches." A trigistor may be placed in an "ON" state by applying a positive pulse to its gate (or control) electrode and once it is in an "ON" state, it will remain there even though the positive gate pulse is removed; a negative pulse on its gate electrode switches it "OFF" and it will remain "OFF" until again pulsed "ON" by a positive pulse. The individual outputs produced by ring counter 12 are taken from terminals 26–30. All cathode electrodes of trigistors $T_1$–$T_n$ are coupled in common via resistance 31 to negative direct current voltage supply 32, this cathode bias voltage being stabilized by the parallel combination of Zener diode 33 and capacitance 34, and all gate electrodes are coupled via bias resistances 35–39 to supply 32 to aid stability of operation in ambient temperature variations. Resistances 41–45 couple the anode electrode of each preceding stage to the gate electrode of each following stage via the associated capacitances 21–25, and resistances 46–50 couple these anode electrodes to the emitter of transistor 54, and via series resistances 51 and 52 to a source of positive direct current potential 53. Transistor 54 has its base electrode coupled via resistance 55 to a source of positive direct current potential 56 and via resistance 57 to positive supply 53; the collector electrode of transistor 54 is coupled via resistance 58 to the gate electrode of trigistor $T_1$. Transistor 59 has its base electrode coupled via resistance 61 to the junction of resistances 51 and 52 and via capacitance 62 to ground potential, its emitter electrode coupled via Zener diode 63 to positive supply 53 and via resistance 64 to ground potential, and its collector electrode coupled via resistance 65 and diode 66 to the gate electrode of trigistor $T_1$ and via Zener diode 67 and resistance 68 to the base electrode of transistor 69. Transistor 69 has its base electrode further coupled via resistance 71 to negative supply 32, its emitter electrode coupled via Zener diode 72 to supply 32, and its collector electrode coupled via resistance 73 and diodes 74–77 to the gate electrodes of trigistors $T_2$–$T_n$.

*Operation*

The operation of the invention occurs in the following manner. Assuming initially that the ring counter 12 is functioning properly and that one stage or trigistor, for example $T_2$, is "ON" or in a state of conduction, a negative going trigger pulse applied to input terminal 13 will be conveyed via diodes 14–18 and capacitances 21–25 to the gate electrodes of trigistors $T_1$–$T_n$. This negative going pulse has no effect on those trigistors which are in an "OFF" state; however, trigistor $T_2$ which is in an "ON" state will be switched "OFF" by the negative going pulse on its gate electrode. When $T_2$ ceases conduction, the potential at its anode electrode and output terminal 27 will rise rapidly approaching the potential at supply 53; this rapid positive rise will be conveyed via resistance 42 and capacitance 23 to the gate electrode of trigistor $T_3$ placing it in an "ON" state, thus completing one step in response to a single negative going trigger input pulse applied to terminal 13. In a similar manner each such negative going trigger pulse will cause the presently conducting stage of ring counter 12 to cease conduction which, in turn, positively pulses the following stage to place it in a state of conduction or "ON" state, the ring counter thus "steps" one stage for each negative going trigger pulse applied to terminal 13. When the $T_n$ stage is conducting and a negative going trigger pulse is applied to terminal 13, it passes via diode 18 and capacitor 25 to the gate electrode of trigistor $T_n$ thereby causing it to cease conduction resulting in a rapid rise in potential at its anode electrode which is conveyed via resistance 45 and capacitance 21 to the gate electrode of trigistor $T_1$ placing it in an "ON" state and completing one full "ring" or cycle of the ring counter 12. Thus, the normal operation of ring counter 12 has been described, and the present invention will now be considered in view of a malfunction in this normal cycle of operation.

First, assume for example that because of adverse ambient temperature or some other such extreme condition, all stages of ring counter 12 are in an "OFF" or non-conducting state. The invention, in block 11, corrects this condition in the following manner. Normally transistor 54 is biased off since its emitter electrode is held more negative than its base electrode due to the voltage drop across resistances 51 and 52 which exists so long as one or more stages of ring counter 12 are conducting; however, when all of these stages are "OFF" the voltage drop across resistances 51 and 52 ceases and the potential at the emitter electrode of transistor 54 rises above that of its base electrode thereby allowing it to conduct, causing a rapid rise in potential at its collector electrode which is conveyed via resistance 58 directly to the gate electrode of trigistor $T_1$. This positive rise in potential causes trigistor $T_1$ to switch to its "ON" state resulting in a reduction in potential at its anode and causing a voltage drop across resistances 46, 51 and 52 which lowers the potential at the emitter electrode of transistor 54 below that of its base electrode causing it to cease conduction. Thus it can be seen that should all stages of ring counter 12 cease conduction, transistor 54 will be placed in a state of conduction just long enough to pulse trigistor $T_1$ placing it in an "ON" state thereby restoring the ring counter to a normal state of operation.

The second type of malfunction to be considered is the condition wherein two or more stages of the ring counter are in an "ON" state simultaneously. The invention senses this condition and corrects it in the following manner. When more than one stage (or trigistor) of ring counter 12 is conducting or in an "ON" state simultaneously, the voltage drop across series resistances 51 and 52 increases thereby lowering the potential at the base electrode of transistor 59 below the potential maintained at its emitter electrode via Zener regulating diode 63 from source 53. This places transistor 59 in a state of conduction causing a rise in potential at the base electrode of transistor 69 causing it to conduct thereby placing a negative potential on the gate electrodes of trigistors $T_2$–$T_n$ via resistance 73 and diodes 74–77. This negative potential thus turns "OFF" any of those trigistors $T_2$–$T_n$ which were in the "ON" state. Further, the increase in potential at the collector of transistor 59 due to its conduction is conveyed via resistance 65 and diode 66 to the gate electrode of trigistor $T_1$ thereby placing it in an "ON" condition, provided it was not already conducting. After trigistors $T_2$–$T_n$ are pulsed "OFF" and trigistor $T_1$ remains, or is placed, in a state of conduction, the voltage drop across series resistances 51 and 52 decreases allowing the potential at the base electrode of transistor 59 to rise above the potential maintained at its emitter electrode thereby causing it to cease conduction resulting in a drop in potential at the base electrode of transistor 69 cutting it off also. Thus it can be seen that so long as one, and only one, of the stages of ring counter 12 is in an "ON" state, which is the normal operating condition, all transistors of the invention, i.e., transistors 54, 59, and 69 of block 11, remain nonconducting; however, if all stages of ring counter 12 should be "OFF" at the same time, transistor 54 will conduct and place trigistor $T_1$ in an "ON" state which, in turn, will then cause transistor 54 to cease conduction again. Further, if more than one stage conducts, or is in an "ON" state, simultaneously, normally nonconducting transistors 59 and 69 are caused to conduct which turns off trigistors $T_2$–$T_n$ and places $T_1$ in an "ON" state thereby restoring normal operation and causing transistors 59 and 69 to return to a nonconducting state.

Thus it becomes apparent from the foregoing description and annexed drawing that the invention, a reliable solid state stabilization circuit for an associated semiconductor ring counter, is a useful and practical device enabling the use of solid state ring counter circuitry in many applications where high reliability and long service-free life are essential requirements, and which have been unattainable with many such ring counters of the prior art.

Obviously many modifications and variations of the present invention are possible in the light of the above teachings, for example, any one of the stages $T_1$–$T_n$ may be selected as the one to be placed in an "ON" state by the invention, rather than $T_1$, as previously described. It is therefore to be understood that, within the scope of the appended claims, the invention may be practiced otherwise than as specifically described.

I claim:

1. In association with a ring counter circuit having a plurality of bistable stages each having a control electrode, a stabilization circuit for coupling thereto in order to correct malfunctions in said ring counter circuit comprising:

- a source of positive anode potential;
- a first means for sensing and correcting a first improper condition of operation of said ring counter circuit wherein all of said plurality of bistable stages are in a nonconducting state simultaneously, said first means being coupled in series between said source of positive anode potential and said plurality of bistable stages of said ring counter circuit for sensing said first improper condition of operation, and said first means being also coupled to one said control electrode of a single preselected stage of said plurality of bistable stages for correcting said first improper condition of operation by placing said preselected stage in a state of conduction; and
- a second means for sensing and correcting a second improper condition of operation of said ring counter circuit wherein more than one of said plurality of bistable stages are in a state of conduction simultaneously, said second means being coupled in series between said source of positive anode potential and said plurality of bistable stages of said ring counter circuit for sensing said second improper condition of operation, and said second means being also coupled to said control electrodes of said plurality of bistable stages for placing one preselected stage in a state of conduction and all other stages in a state of nonconduction.

2. In association with a ring counter circuit having a plurality of bistable stages each having a control electrode, a stabilization circuit for coupling thereto in order to correct malfunctions in said ring counter circuit as set forth in claim 1 wherein said first means for sensing and correcting a first improper condition of operation of said ring counter circuit includes a first normally nonconducting electron control means having biasing resistance means coupled in series between said source of positive anode potential and said plurality of bistable stages of said ring counter circuit for sensing said first improper condition of operation and then placing said first electron control means in a state of conduction, said first electron control means being also coupled to said control electrode of a single preselected stage of said plurality of bistable stages for correcting, when placed in a state of conduction, said first improper condition of operation.

3. In association with a ring counter circuit having a plurality of bistable stages each having a control electrode, a stabilization circuit for coupling thereto in order to correct malfunctions in said ring counter circuit as set forth in claim 2 wherein said second means for sensing and correcting a second improper condition of operation of said ring counter circuit includes second and third normally nonconducting electron control means, said second electron control means having bias resistance means coupled in series between said source of positive anode potential and said plurality of bistable stages of said ring counter circuit for sensing said second improper condition of operation and subsequently placing said second and third electron control means in a state of conduction thus enabling said second electron control means to place one preselected stage of said ring counter circuit in a state of conduction and enabling said third electron control means to place all other stages of said ring counter circuit in a state of non-conduction.

4. In association with a ring counter circuit having a plurality of bistable stages each having a control electrode, a stabilization circuit for coupling thereto in order to correct malfunctions in said ring counter circuit as set forth in claim 3 wherein each stage of said plurality of stages of said ring counter circuit comprises a four-layer, three-electrode, bistable semiconductor means, and said first, second, and third electron control means comprise transistor means.

5. A stabilization circuit for correcting malfunctions in an electronic ring counter circuit having a plurality of bistable stages each having a control electrode, said stabilization circuit comprising:

a source of positive anode potential;

a first normally nonconducting transistor means for sensing and correcting a first improper condition of operation in said electronic ring counter circuit wherein all of said plurality of bistable stages are in a nonconducting state simultaneously, said first transistor means having bias resistance means coupled in series between said source of positive anode potential and said plurality of bistable stages for sensing said first improper condition of operation and placing said first transistor means in a state of conduction in response thereto, said first transistor means also being coupled to said control electrode of a single preselected stage of said plurality of bistable stages for correcting said first improper condition of operation by placing said preselected stage in a state of conduction; and second and third normally nonconducting transistor means for sensing and correcting a second improper condition of operation of said ring counter circuit wherein more than one of said plurality of bistable stages are in a state of conduction simultaneously, said second transistor means having bias resistance means coupled in series between said source of positive anode potential and said plurality of bistable stages of said ring counter circuit for sensing said second improper condition of operation and thereupon placing said second transistor means in a state of conduction which in turn places said third transistor means in a state of conduction also, said second and third transistor means being further coupled to said control electrodes of said plurality of bistable stages for placing one preselected stage in a state of conduction and all other stages in a state of nonconduction.

No references cited.

ARTHUR GAUSS, *Primary Examiner.*